United States Patent [19]
Waddoups et al.

[11] Patent Number: 5,539,565
[45] Date of Patent: Jul. 23, 1996

[54] METHOD AND APPARATUS FOR A SELECTIVE OPTICAL RETROREFLECTOR

[75] Inventors: Ray O. Waddoups, Mesa; John S. Scavarda, Fountain Hills, both of Ariz.

[73] Assignee: Motorola, Inc., Schaumburg, Ill.

[21] Appl. No.: 534,432

[22] Filed: Sep. 27, 1995

[51] Int. Cl.⁶ .................................................. H04B 10/00
[52] U.S. Cl. ............................ 359/170; 342/45; 359/169
[58] Field of Search .................................. 359/169, 170, 359/172, 152, 155; 342/45, 53, 54

[56] References Cited

U.S. PATENT DOCUMENTS

| | | | |
|---|---|---|---|
| 3,911,432 | 10/1975 | Williams | 343/5 R |
| 3,989,942 | 11/1976 | Waddoups | 359/170 |
| 4,134,008 | 1/1979 | De Corlieu et al. | 359/170 |
| 4,361,911 | 11/1982 | Buser et al. | 359/169 |
| 4,731,879 | 3/1988 | Sepp et al. | 359/169 |
| 5,274,379 | 12/1993 | Carbonneau et al. | 342/45 |

*Primary Examiner*—Leo Boudreau
*Assistant Examiner*—Rafael Bacares
*Attorney, Agent, or Firm*—Frank J. Bogacz

[57] ABSTRACT

An optical retroreflector apparatus and method detects (20) incident light radiation (12). A processor (30) periodically enables the detector (20, 60–64) to receive a signal included in the incident light radiation (12). A reflector (40) is triggered by receipt of a particular signal included in the incident light radiation to reflect a coded signal toward the source of the incident light radiation.

18 Claims, 2 Drawing Sheets

METHOD AND APPARATUS FOR A SELECTIVE OPTICAL RETROREFLECTOR

BACKGROUND OF THE INVENTION

The present invention pertains to friend-or-foe identification systems and more particularly to a method and apparatus for an optical retroreflector.

A known form of identification friend-or-foe technology utilizes an RF transmitter that broadcasts a message indicating the friendly nature of a potential target. Such RF systems are easily jammed.

It would be highly desirable to have a system which provides radiation from a target thus decreasing power consumption and enhancing security of the friend-or-foe identification process.

DESCRIPTION OF THE PREFERRED EMBODIMENT

Figure 1:
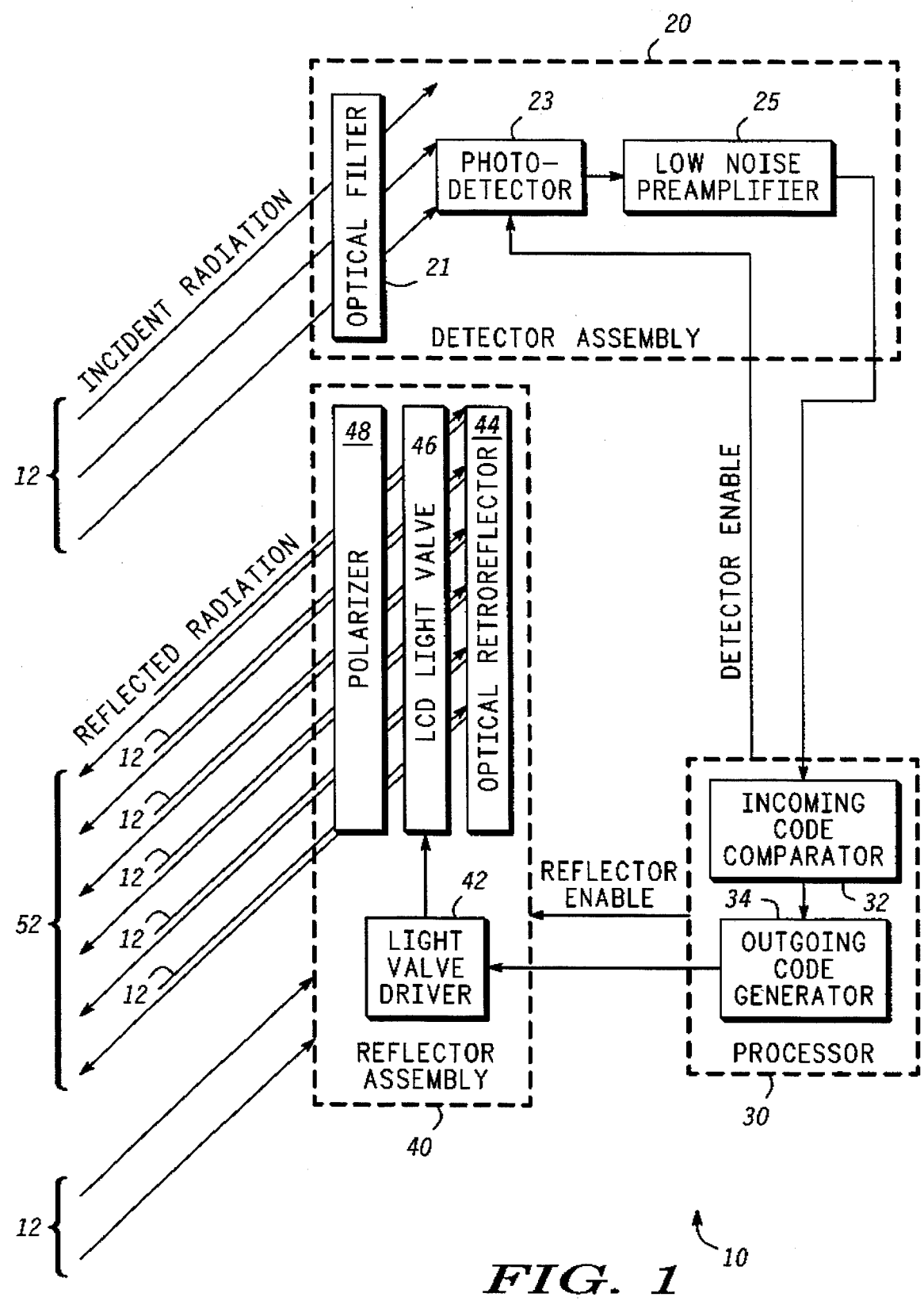
FIG. 1 is a functional block diagram of a selective optical retroreflector in accordance with the present invention.

Referring to FIG. 1, a functional block diagram of an optical retroreflector is shown. Detector assembly 20 includes optical filter 21, photodetector 23 and low noise preamplifier 25. Incident radiation 12 falls upon optical filter 21. Optical filter 21 passes only near infrared wavelengths to be detected by photodetector 23. The photodetector 23 is periodically enabled by the detector enable of the system processor 30. Processor 30 includes a microprocessor. In the enabled condition, the system 10 is capable of detecting optical energy from incident radiation 12. In the disabled condition, the low noise preamplifier 25 and photodetector 23 are unpowered. This enable-disable cycle provides an adequate period for detection of the illuminator and conserves battery energy.

Incident radiation 12 from a illuminating source (not shown) impinges on the photodetector 23 after being filtered by optical filter 21. When the detector assembly 20 is enabled, the received energy is converted to an electrical signal by photodetector 23. This electrical signal is then amplified by low noise preamplifier 25 and sent to the system processor 30.

The system processor 30, which may implemented with a microprocessor, includes incoming code comparator 32 and outgoing code generator 34.

The system processor 30 strips the modulation or encoding from the electrical signal then incoming code comparator 32 compares the stripped signal with the current baseline. A current baseline is a current battlefield code indicating that the illuminating source is friendly in nature, for example. The system processor 30 will notify the soldier of the friend-or-foe nature of the illumination. The battlefield code may be updated as required to ensure battlefield security. When the encoding does not match, the photodetector 23 is disabled by the processor system 30 and reverts to its normal enable-disable cycle.

When the stripped signal and baseline match, the system processor 30 enables the reflector assembly 40. Reflector assembly includes light valve driver 42, optical retroreflector 44, and LCD (liquid crystal diode) light valve 46 and polarizer 48. The retroreflected beam of retroreflector 44 is very narrow. Within the reflector assembly 40 is the optical retroreflector 44, which reflects incident energy back toward the source of illumination. The reflector assembly 40 also has a liquid crystal diode (LCD) light valve 44. This valve 46, when used in conjunction with polarized 48, transmits optical energy when a voltage is applied, and blocks optical energy in the absence of a voltage. Outgoing code generator 34 codes a signal transmitted to light valve driver 42. Light valve driver 42 modulates (codes) the retroreflected light of the LCD light valve 46 with the code from the code generator 34. As a result, incident radiation 12 from the illuminating source is modulated (coded) and then returned as reflected, coded radiation 52 to the illuminating source. Upon receiving this optical signal, the illuminating source can identify the potential target as friendly or not.

A typical source of supply for the polarizer 48 and optical filter 21 is Optical Coating Laboratory Inc. or Janos. The photodetector 23 is available from EG&G. Furthermore, many photodetector manufacturers include the low noise preamplifier 25 in the same package, thereby reducing size, complexity of implementation in the system, and overall cost. The LCD light valve 46 and light valve driver 42, may be obtained from Meadolark Optics, Inc. or Thor Labs. Optical retroreflector 44 may be obtained from a supplier such as Banner Engineering Corp. The Processor 30 is a common microprocessor as made by Motorola.

This invention may be carried by a dismounted soldier or mounted on a combat vehicle. In its man carried form, the components will be miniaturized to reduce the overall weight and size. The power consumption will be minimized to prolong battery life. Although these concerns also apply to combat vehicles, size and power consumption limitations are less significant and must be traded off against increased sensitivity requirements needed for longer ranges.

Figure 2:
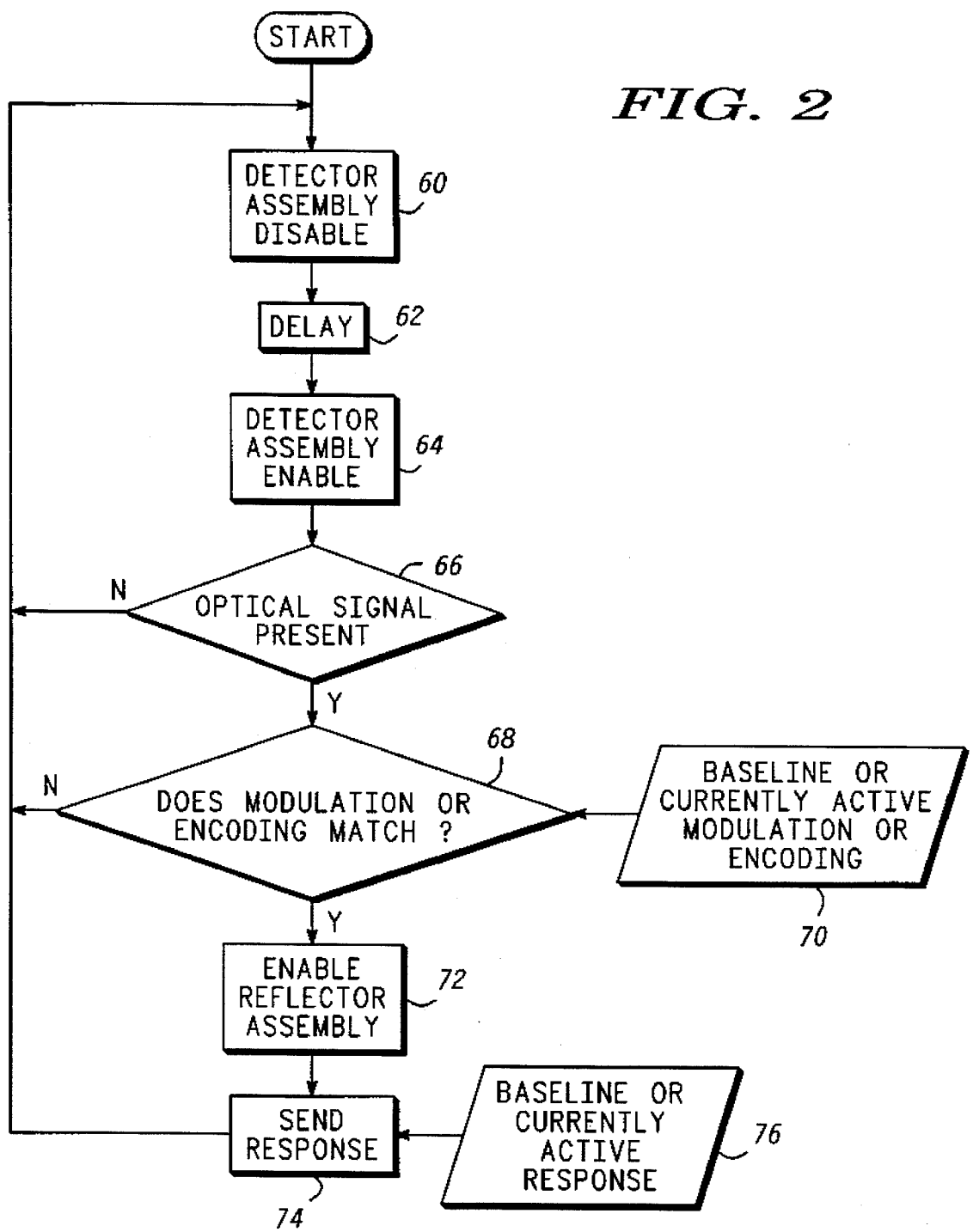
FIG. 2, is a flow chart of a method for a selective optical retroreflector in accordance with the present invention.

FIG. 2, is a flow chart of a method for a selective optical retroreflector. The method is begun by transferring control to the start block. The system processor 30 enables the detector assembly 20, block 60. Block 62 provides a delay. The delay duration is optimized to maximize battery life while providing an adequate detection period for incident illumination. This performance tradeoff may be adjusted for each specific embodiment of the selective optical retroreflector system.

System processor 30 then enables the detector assembly via the detector enable lead, block 64. System processor then determines whether an optical signal is present at the photodetector 23, block 66. If no optical signal is present, block 66 transfers control to block 60 and the above process is repeated (blocks 60–66). If an optical signal is present at the photodetector 23, block 66 transfers control to block 68.

Block 68 strips the modulation (coding) from the input optical signal and determines whether this detected coding matches the currently active baseline coding. Block 70 dynamically retrieves the currently active baseline coding for block 68 to make its determination. If the coding of the input signal does not match the current active friend code (currently active baseline coding), block 68 transfers control to block 60 and the above process is repeated (blocks 60–68). If the coding of the input signal matches the current active friend code (currently active baseline coding), block 68 transfers control to block 72.

Block 72 enables the reflector assembly 40. That is, system processor 30 provides a signal on the reflector enable lead. The input light wave 12 is reflected by optical retroreflector 44. Output code generator 34 provides the current active friend code (currently active baseline coding) to light valve driver 42, block 76. Light valve driver then modulates LCD light valve 46 to code the output signal 52 with the currently active battlefield (baseline) coding. Polarizer 48 polarizes the output optical signal 52 and transmits the signal, block 74. The process is then repeated beginning at block 60.

This invention may be used as part of a friend-or-foe identification system. A helmet mounted version would be used by dismounted soldiers. It would provide adequate sensitivity for soldier-to-soldier encounters. A vehicle mounted version would provide increased sensitivity and aperture needed for the extended ranges involved in vehicle-to-vehicle or aircraft-to-vehicle encounters.

This invention may also be used by law enforcement officers for positive identification of other officers during terrorist suppression activities.

The advantage of this invention is the reflector assembly which uses a new combination of components. These are: polarizer, LCD light valve, and planar optical retroreflector. An incident optical signal may be selectively returned to the source of illumination, and may include additional signal modulation in order to streamline the friend-or-foe identification process.

Active radiation is produced from an illuminating source. Since a target only reflects light, it is passive. The savings in power consumption and the enhanced security result from the passive nature of the target.

Used in conjunction with a conventional optical detection system, the reflector assembly may be activated by a remote source. Specified modulation or encoding on the incident signal may be processed through a decision filter that conditionally activates the reflector assembly. This allows the flexibility of easily and readily changing the current battlefield (baseline) coding for recognition of friend or foe.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. An apparatus for an optical retroreflector comprising:
   a detector for receiving incident light radiation;
   a processor coupled to said detector, said processor periodically enabling said detector to receive said incident light radiation, said processor producing a coded signal from said incident light radiation in response to a particular signal included in said incident light radiation; and
   a reflector coupled to said processor, said reflector transmitting said coded signal in a reflected light radiation.

2. The apparatus as claimed in claim 1, wherein said reflector includes an optical retroreflector for reflecting said incident light radiation to produce a reflected light signal.

3. The apparatus as claimed in claim 2, wherein said reflector further includes a LCD light valve coupled to said optical retroreflector and to said processor, said LCD light valve for combining said reflected light signal with said coded signal to produce said reflected light radiation.

4. The apparatus as claimed in claim 3, wherein said reflector further includes a light valve driver coupled to said processor and to said LCD light valve, said light valve driver enabling said LCD light valve and for transmitting said coded signal from said processor to said LCD light valve.

5. The apparatus as claimed in claim 4, wherein said reflector further includes a polarizer coupled to said LCD light valve, said polarizer for polarizing said reflected light radiation.

6. The apparatus as claimed in claim 5, wherein said detector includes an optical filter for filtering said incident light radiation.

7. The apparatus as claimed in claim 6, wherein said detector further includes a photodetector coupled to said optical filter for detecting said filtered incident light radiation and producing an electrical output.

8. The apparatus as claimed in claim 7, wherein said detector further includes a low noise preamplifier coupled to said photodetector, said low noise preamplifier amplifying the electrical output.

9. The apparatus as claimed in claim 8, wherein said processor includes an incoming code comparator coupled to said low noise preamplifier, said incoming code comparator for comparing said particular signal to a predetermined signal and said incoming code comparator providing an indication of a comparison or miscomparison.

10. The apparatus as claimed in claim 9, wherein said processor further includes an outgoing code generator coupled to said incoming code comparator and to light valve driver, said outgoing code generator producing said coded signal.

11. A method for an optical retroreflector comprising the steps of:
    detecting by a detector an incident light radiation including a particular signal;
    producing a coded signal in response to the particular signal included in the incident light radiation; and
    reflecting a coded signal in response to the particular signal; and wherein there is further included a step of periodically enabling the detector to receive the incident light radiation including the particular signal.

12. The method as claimed in claim 11, wherein there is further included the steps of:
    determining whether the particular signal is present in the incident light radiation; and
    repeating the steps of periodically enabling and determining, if the incident light radiation does not include the particular signal.

13. The method as claimed in claim 12, wherein the step of producing a coded signal includes the step of determining whether the particular signal matches a predefined current signal, if the incident light radiation includes the particular signal.

14. The method as claimed in claim 13, wherein the step of determining whether the particular signal matches includes the step obtaining the predefined current signal from a data base.

15. The method as claimed in claim 14, wherein the step of reflecting includes the step enabling a reflector to transmit the coded signal, if the particular signal matches the predefined current signal.

16. The method as claimed in claim 15, wherein there is further included the step of repeating the steps of claims 12 through 16, if the particular signal does not matches the predefined current signal.

17. The method as claimed in claim 16, wherein the step of reflecting includes the step of transmitting reflected light radiation including the coded signal by an optical retroreflector.

18. The method as claimed in claim 17, wherein the step of transmitting reflected light radiation includes the step of transmitting from a data base a currently active response signal.

* * * * *